United States Patent
Namburi (10) Patent No.: US 10,452,491 B2
(45) Date of Patent: Oct. 22, 2019

(54) SCALABLE LOG PARTITIONING SYSTEM

(71) Applicant: SAP SE, Walldorf (DE)

(72) Inventor: Mallikarjuna Rao Namburi, Dublin, CA (US)

(73) Assignee: SAP SE, Walldorf (DE)

( * ) Notice: Subject to any disclaimer, the term of this patent is extended or adjusted under 35 U.S.C. 154(b) by 788 days.

(21) Appl. No.: 15/099,401

(22) Filed: Apr. 14, 2016

(65) Prior Publication Data

US 2017/0300391 A1    Oct. 19, 2017

(51) Int. Cl.
*G06F 16/23* (2019.01)
*G06F 16/2455* (2019.01)
*G06F 11/14* (2006.01)

(52) U.S. Cl.
CPC ...... *G06F 11/1469* (2013.01); *G06F 16/2358* (2019.01); *G06F 16/2365* (2019.01); *G06F 16/24554* (2019.01)

(58) Field of Classification Search
CPC ............. G06F 11/1469; G06F 16/2365; G06F 16/24554; G06F 16/2358
See application file for complete search history.

(56) References Cited

U.S. PATENT DOCUMENTS

| | | | | |
|---|---|---|---|---|
| 5,499,367 | A * | 3/1996 | Bamford | G06F 11/1471 |
| 6,289,355 | B1 * | 9/2001 | Haderle | G06F 11/1471 |
| 9,092,475 | B2 * | 7/2015 | Schreter | G06F 17/30 |
| | | | | 707/756 |
| 2007/0220059 | A1 * | 9/2007 | Lu | G06F 16/2358 |
| 2010/0161565 | A1 * | 6/2010 | Lee | G06F 11/1471 |
| | | | | 707/674 |
| 2011/0246503 | A1 * | 10/2011 | Bender | G06F 9/546 |
| | | | | 707/769 |
| 2014/0244581 | A1 * | 8/2014 | Rath | G06F 16/27 |
| | | | | 707/623 |
| 2015/0254264 | A1 * | 9/2015 | Yu | G06F 11/1469 |
| | | | | 707/674 |
| 2015/0261839 | A1 | 9/2015 | Namburi | |
| 2016/0125018 | A1 * | 5/2016 | Tomoda | G06F 16/2358 |
| | | | | 707/703 |

\* cited by examiner

*Primary Examiner* — James Trujillo
*Assistant Examiner* — Hubert Cheung
(74) *Attorney, Agent, or Firm* — Fountainhead Law Group P.C.

(57) ABSTRACT

Embodiments include an improved database logging system where transactions are allocated to multiple different partitions of a database log file and log records for transactions are written to different partitions of a database log. Each partition can store log records for a separate transaction in a separate log cache memory. Writing log records to a page of the database log can be prevented until previous log records modifying that same page have been written to disk. A sequential timestamp that is unique across the plurality of partitions may be assigned to the log records for this purpose, and a log record containing a modification to a page can be flushed after previous modifications to the page have been written to disk. Restore operations can then be performed by copying the log records of the multiple partitions into a priority data structure and ordered into a merged list based on timestamp.

20 Claims, 7 Drawing Sheets

SCALABLE LOG PARTITIONING SYSTEM

TECHNICAL FIELD

At least certain embodiments described in this disclosure relate generally to database systems, and in particular to an improved database log partitioning system for database recovery operations.

BACKGROUND

A common technique for storing a database in a data storage system is to assign database tables to a tablespace. A tablespace is a named collection of one or more datasets. Each tablespace is divided into equal units called data pages, each data page contains one or more tuples of data. A tuple typically consists of one record (e.g., one row) in a database table of the database.

Database systems are susceptible to data loss after a system failure. To prevent data loss, database systems usually copy the database from a volatile storage device to a non-volatile storage device. Modifications to data in pages of a database are recorded in a database log file (or database log) for performing recovery operations. A database log file contains a list of time-ordered actions that indicate what modifications were made to the database, and in what order those changes were made. The database log file is also stored in the non-volatile storage device for data durability.

Database recovery after a system failure generally involves reading the log file and applying log records from the log file to the appropriate page in the database in the order in which the log records were written into the log file. The page is read from an input/output ("I/O") buffer. The required modifications indicated in the log file are applied to the page. The page is then written back into the I/O buffer for subsequent storage in the database. This process is repeated until all the log records are applied to the database and the database is restored to its previous state before the system failure.

Many database systems implement partitioning to improve performance. Partitioning a database log file into distinct parts can improve performance and availability of data. Also log partitioning can be used to enable multiple machines (or multiple process threads in a single machine) to write transaction log records to the database log in parallel. Such database systems implement a "last log buffer page" for appending new log records to the log. Conventionally, the last log buffer page is shared among all of the partitions and is configured to sort the log records as they are received from multiple sources. The last log buffer page can then record the log records in the sorted order.

Because the last log buffer page of conventional systems is shared across multiple systems or process threads, such systems do not scale well for extreme online transaction processing ("OLTP"). For OLTP conventional logging systems experience a bottleneck at the shared last log buffer page as it is accessed across the multiple machines or processes.

SUMMARY

The embodiments described in this disclosure include an improved database log partitioning system for database recovery operations.

The following detailed description and accompanying drawings provide a better understanding of the nature and advantages of the present disclosure.

BRIEF DESCRIPTION OF THE DRAWINGS

For a better understanding of at least certain embodiments, reference will be made to the following detailed description, which is to be read in conjunction with the accompanying drawings.

DETAILED DESCRIPTION

Throughout the description, for the purposes of explanation, numerous specific details are set forth in order to provide a thorough understanding of the present disclosure. It will be apparent to one skilled in the art, however, that the techniques described in this disclosure may be practiced without some of these specific details. In other instances, well-known structures and devices may be shown in block diagram form to avoid obscuring the principles and techniques described in this disclosure.

At least certain embodiments involve an improved database logging system where database partitions include their own separate last log buffer page. A private log cache is allocated to the partitions of a plurality of partitions in the system. The private log caches of the partitions may be configured to store log records for transactions. A transaction or transaction family can be allocated to a particular partition and the log records associated with the transaction can be written to a corresponding partition of a database log. In one embodiment, the transactions may include, for example, INSERT, SELECT, UPDATE, and DELETE operations, etc. (collectively "ISUD" operations).

In at least certain embodiments, the partitions are also configured with their own separate last log buffer page. In operation, log records that modify a particular page of a tablespace of a database can be moved from the private log cache of the particular partition into the corresponding partition's last log buffer page. If one or more of the last log buffer pages of other partitions contain modifications to the page that have not been written to disk, a link can be provided in the last log buffer page of the partition that references (i.e., points to) the corresponding private log cache entry for those one or more other partitions. This link can prevent writing to the page until the linked log records in the private log caches of the other partitions have been written to disk. In one embodiment, this is referred to as "pinning" the page. A page is "pinned" to the particular partition/transaction that is currently modifying the page in the database until the log records have been flushed to disk and stored in the appropriate partition of the database log file.

In order to accomplish this, a sequential timestamp that is unique across the plurality of partitions can be generated and assigned to the log records, where a particular log record containing a modification to the page can be applied only after the previous modifications to the page have been written to disk. The sequential timestamps may be generated once and assigned to a log record.

At least certain embodiments of the present disclosure also involve a technique for restoring a database in a computer system. Upon a system failure, the system can be configured to perform restore operations to restore the database to its previous state before the system failure by comparing the timestamps of the log records of the various last log buffer pages of the plurality of partitions, and to order the log records based on the timestamp.

In one embodiment, this can be accomplished by copying the log records in the plurality of last log buffer pages of the plurality of partitions into a priority queue (or other similar data structure) in the database logging system. The timestamps assigned to the log records can then be compared among each other and log records can be applied to the database in order of the earliest/lowest sequential timestamp first.

In one embodiment, the priority queue data structure may comprise a "heap" data structure (or other similar data structure or priority scheme). In computer science, a "heap" data structure generally refers to a tree-based data structure that satisfies a "heap property". For example, if a node "A" is a parent node of node "B", then the key of node A can be ordered with respect to the key of node B with the same ordering applying across the heap. A heap can be classified further as either a "max heap" or a "min heap". In a max heap, the keys of parent nodes are greater than or equal to those of the children and the highest key is in the root node. In a min heap, the keys of parent nodes are less than or equal to those of the children and the lowest key is in the root node.

A common implementation of a heap is a binary heap, in which the tree is a complete binary tree. In a heap, the highest (or lowest) priority element is stored at the root. A heap is not a sorted structure and can be regarded as partially ordered or pseudo-ordered. There is no particular relationship among nodes on any given level, even among the siblings. A heap is a useful data structure for removing an object with the highest (or lowest) priority.

In the embodiments of this disclosure, the ordering may be accomplished, for example, by performing a min-heap algorithm on the log records stored in the heap data structure to obtain a merged list of log records that can be ordered based on the earliest timestamp. In other embodiments, the latest/highest timestamp can be used for the ordering, and inverted at some point in the process. Other similar data structures may be used such as a stack buffer to accomplish the ordering.

A transaction is a unit of work that is performed against a database. A transaction is the propagation of one or more changes to the database. Transactions are units or sequences of work accomplished in a logical order, whether in a manual fashion by a user or automatically by some sort of a database program. For example, if a log record is being created or modified, then a transaction is performed on the table to accomplish this. Ordering of transactions is controlled to ensure data integrity and to handle database errors and recovery from system failures.

In accordance with certain embodiments, a database contains pages of objects and is stored on a data storage device in communication with a database host server. After a system failure, a log file can be read. The log file may contain one or more modifications to the database objects stored in the database. Each modification of a page in the database can be provided in a log record which has an associated sequential timestamp. The modifications can be sorted by the timestamp and applied to each database page object.

I. Illustrative Systems

Provided below is a description of an example system upon which the embodiments described in this disclosure may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks.

In accordance with certain embodiments, a database contains pages of objects and is stored on a data storage device in communication with a database host server. After a system failure, a log file can be read. The log file may contain one or more modifications to the database objects stored in the database. Each modification of a page in the database can be provided in a log record which has an associated sequential timestamp. The modifications can be sorted by the timestamp and applied to each database page object.

Figure 1:
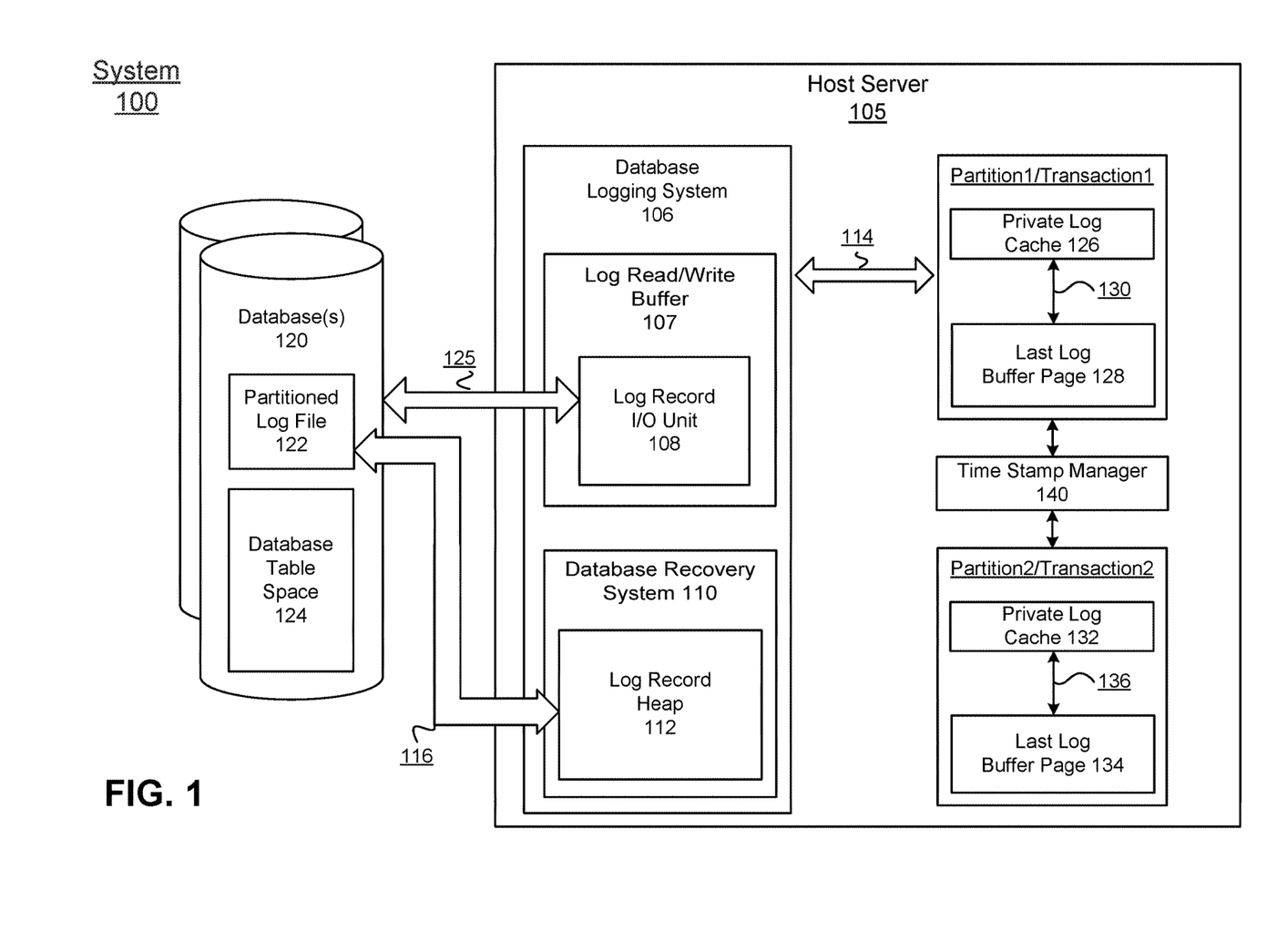
FIG. 1 depicts a conceptual block diagram of an example embodiment of a database logging system comprising a partitioned log file in accordance with the techniques described in this disclosure.

FIG. 1 depicts a conceptual block diagram of an example embodiment of a database logging system comprising a partitioned log file in accordance with the techniques described in this disclosure. In the illustrated embodiment, system 100 includes a host server 105 in communication with one or more databases 120 via one or more networks or other communication media 125. The host server 105 includes a database logging system 106. The database logging system 106 includes a log read/write buffer 107 and the database recovery system 110. The log read/write buffer 107 includes a log I/O unit 108. The database recovery system 110 includes a log record heap data structure 112.

The host server 105 may be implemented as an individual computer hardware server or as an array of computer hardware servers logically coupled together and working in a functionally coordinated manner. The host server 105 may be configured to perform data access operations with respect to data stored in one or more repositories of data (e.g., database(s) 120). Depending on the type of server, the data operations may range from simple operations, such as storing and retrieving data, to more complex operations such as calculating statistics based on the data, or arranging, modifying, or formatting data. In one embodiment, the database(s) 120 may be remote from the host server, and the host server may be in communication with the one or more databases 120 via one or more networks or other communication mediums 125. In other embodiments, the one or more databases 120 may be components coupled with the host server 105, and the host may be in communication with the database 120 via one or more direct or indirect communication links 125 within a system.

In one embodiment, the database 120 may be configured as a relational database in which data can be stored in structured database tables (or other data structures) comprising of rows and columns, and accessed through data storage rules (or schemas). Other examples of database systems include database systems where data can be stored in a semi-structured or unstructured format. In the illustrated embodiment, database(s) 120 includes a database tablespace 124 and a partitioned database log file 122. The database tablespace 124 may comprise a plurality of database tables (not shown), as well as other data structures, that are configured to store a plurality of data pages configured to store one or more data objects of the database.

The host server 105 also includes a system memory (not shown). The system memory may be configured to store programs and other information and instructions to be executed by one or more processors (not shown), including information and instructions for performing the techniques described in this disclosure. The system memory may include multiple memory components of different types, including random access memory ("RAM"), read only memory ("ROM"), flash memory, cache memory, memory buffers, and/or disk-based memory, or combination thereof, etc. The system memory may also include a disk-based storage device, such as a hard disk, for storing information. Typically such a storage device comprises nonvolatile memory. Common forms of nonvolatile memory include, for example, a hard drive, a magnetic disk, an optical disk, a CD-ROM, a DVD, a flash memory or other non-volatile memory, a universal serial bus ("USB") memory card, or any other computer-readable storage medium from which a computer can read data and instructions.

Multiple transactions can be allocated to partitions within the host server 105. In this example, host server 105 includes a first partition (partition1) and a second partition (partition2). Partition1 and partition2 may be stored in the system memory of host server 105. As shown in the embodiment, partition1 includes a private log cache 126 and a last log buffer page 128 in communication with the private log cache 126 via a first communication network or medium 130, and partition2 includes a private log cache 132 and a last log buffer page 134 in communication with the private log cache 132 via a second communication network or medium 136. Further, partition1 and partition 2 are in communication with the database logging system 106 via one or more networks or communication mediums 114. It should be noted, however, that the embodiments described in this disclosure are scalable to any number of partitions.

In the depicted embodiment, partition1 corresponds to transaction1 (or family of transactions) and partition corresponds to transaction2 (or family of transactions). In operation, the transactions received by the host server 105 may be allocated (e.g., dynamically) to partitions within the host server 105. When log records for transactions are received, they can be stored in a corresponding private log cache for the selected partition.

A log record that is configured to modify a page of the tablespace 124 of the database 120 can be copied from the private log cache of a particular partition into the last log buffer page for the partition. For example, a log record in the private log cache 126 of partition1 that attempts to modify a page of the tablespace 124 can be copied from the private log cache 126 into the last log buffer page 128 of partition 1 via communication network or medium 130, and a log record in the private log cache 132 of partition2 that attempts to modify a page of tablespace 124 can be copied from the private log cache 132 into the last log buffer page 134 of partition2 via communication network or medium 136.

As discussed previously, each of the partitions described in this disclosure may include its own the last log buffer page. This is different from the convention systems which include a shared last log buffer page. Accordingly, at least certain embodiments are configured to avoid the bottlenecks experienced by conventional systems writing to a shared last log buffer page. Instead, embodiments are configured with a last log buffer page for each partition that can be associated with a particular transaction or transaction family. With the partitions writing log records for transactions to their own endpoints in their own separate last log buffer page, the need for multiple partitions accessing the same buffer page is avoided.

However, in order to manage multiple partitions writing log records to their own last log buffer page end point, collisions need to be accounted for and avoided, particularly in cases where multiple partitions are attempting to modify the same page in the tablespace 124. In one example embodiment, this can be accomplished using the time stamp manager 140 depicted in FIG. 1. When a log record for a transaction containing a modification to be flushed to a particular page of the database 120 is received at a partition, the timestamp manager 140 can be consulted to determine whether there are any previous log records containing modifications to that same page that are yet to be flushed to the database log file by the system. Specifically, the timestamp manager 140 can be consulted to determine if any previous log records having a previously assigned sequential timestamp have not yet been flushed to the database log file. Timestamps can be sequentially assigned to the log records to order the transactions in the system.

In one embodiment, if there are previous log records with assigned timestamps that have not been flushed to the database log file, the techniques of the present disclosure can be adapted to wait until the previous log records with earlier timestamps are flushed to disk and applied to the database log file 122 before handling the current log record. In particular, if there are previous log records with previously assigned timestamps that have not yet been flushed to the database log file 122, the host server 105 may be configured to place a link (e.g., a pointer) to the private log cache in which the pending log record is stored to indicate that the log record needs to be flushed to disk before another process can write log records to the page to be modified. Thus, the page may be pinned to a current pending transaction and partition processing the transaction to prevent a subsequent log record from modifying the page until the previous change to the page is written to disk.

In one embodiment, this process comprises writing the log records with assigned timestamps to the log write buffer 107 and flushing the log records in the log write buffer 107 to disk via the log record I/O unit 108 via communication network or medium 125. Upon flushing the log records with previously assigned timestamps that are modifying the page in the database 120, the next sequential timestamp can then be assigned to the current log record containing the next modification to be applied, and the log record can be flushed to the database log file 122 after the timestamp has been assigned. In this manner, changes to the same page (or other physical container) that are received out of order can be handled. The previous log records can therefore be flushed to disk before a new timestamp is generated and assigned to the next log record from a different transaction that is attempting to modify the same page.

In addition, it should be noted that each timestamp is unique and can be sequentially assigned. For example, timestamp1 is less than timestamp2 in the sequence of timestamps, which is less than timestamp3, and so on. This enables the database system to merge the log records of a plurality of different transactions from the plurality of different partitions in the system into a pseudo-ordered list based on the timestamp associated with the log records. The partitions write log records to their own end points in their separate last log buffer pages, so when it comes time to use them—such as during a restore operation after a system failure—the log records can be ordered across multiple partitions based on the timestamp to allow the system to recover to a previous consistent point. In one embodiment, during a restore operation, the pseudo-ordered log records in the partitioned log file 122 can be copied to the log record heap 112 of the database recovery system 110 via one or more communication networks or mediums 116. Organizing the log records into a merged list in the log record heap 112 is during data recovery operations is discussed in detail below.

In addition, as will be appreciated by persons of skill in the art, the network(s) or communication medium(s) 114, 116, 125, 130, and 136 may be implemented as a single wired or wireless network, or multiple separate networks in communication with one another. The networks described in this disclosure may be implemented as any wired or wireless network(s). For example, the networks can be implemented as a local area network ("LAN"), wide-area network ("WAN"), combination of LANs and WANs, the Internet, or any other type of communication network adapted for communicating electronic messages and information, etc. Further, the networks may be implemented as a physical array of hardware resources or as a virtual array, or any combination thereof. The networks may also be implemented in a cloud-based network configuration. For example, the networks described in this disclosure may be implemented as public or private cloud network, or combination thereof. No specific network or network architecture should be construed as limiting the embodiments and techniques described in this disclosure.

Figure 2:
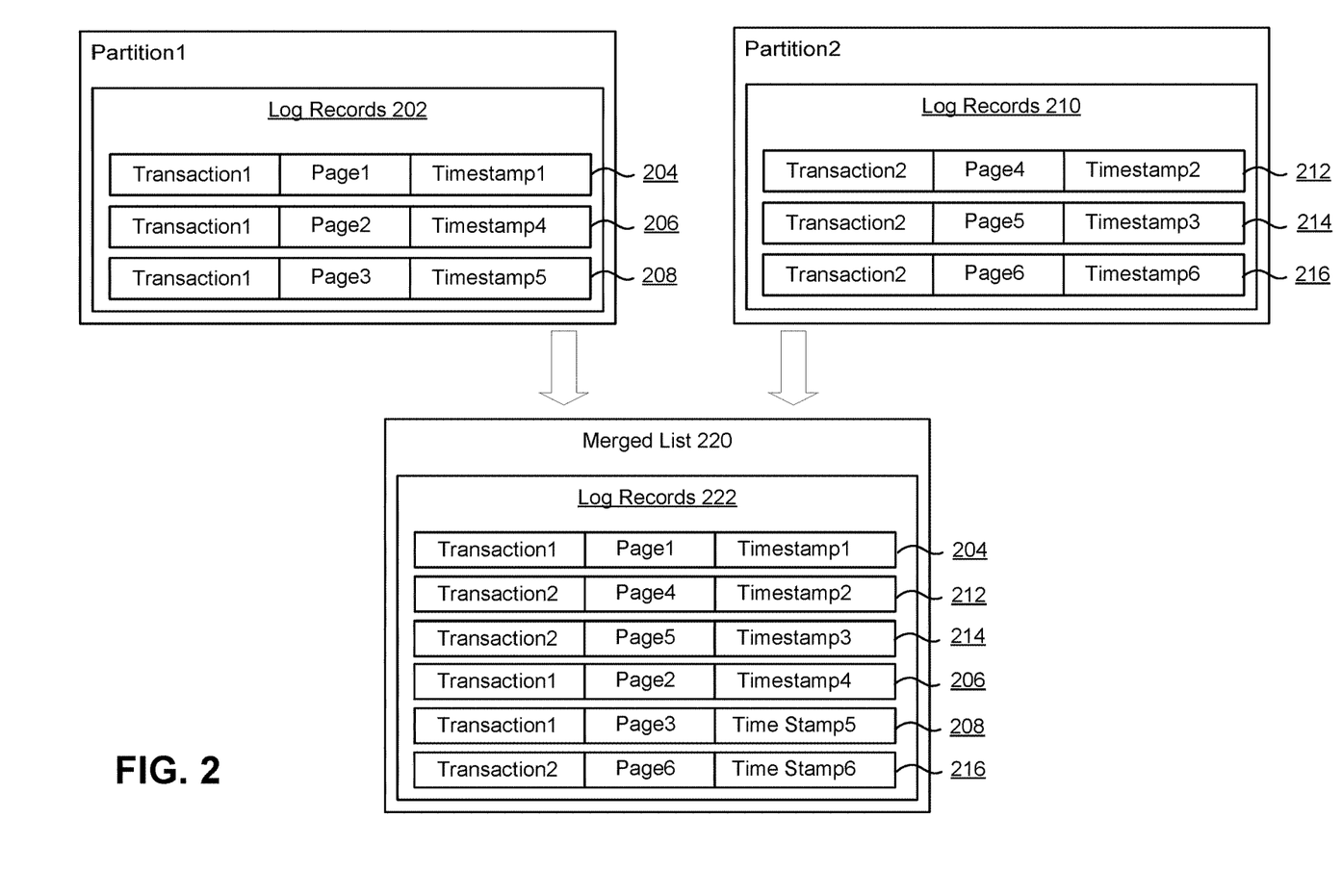
FIG. 2 depicts an example of merging log records for a restore operation in accordance with the techniques described in this disclosure.

FIG. 2 depicts an example of merging log records for a restore operation in accordance with the techniques described in this disclosure. In the illustrated embodiment, the log records 202 associated with partition1 are being merged with the log records 210 associated with partition2. Each log record may include a transaction identifier (e.g., transaction1 or transaction2), a page identifier for the page to be modified, and a timestamp. Although not shown, the log records may also include an offset in the log file for the bytes to be written to as well as the bytes to be written (e.g., payload) at the offset in the log file. In one embodiment, merging may be accomplished using a log record heap data structure (or other data structure was similar functionality, such as a priority queue data structure or a stack buffer, etc.). As shown, the merged list 220 comprises log records 222 ordered according to earliest/lowest timestamp first.

Figure 3:
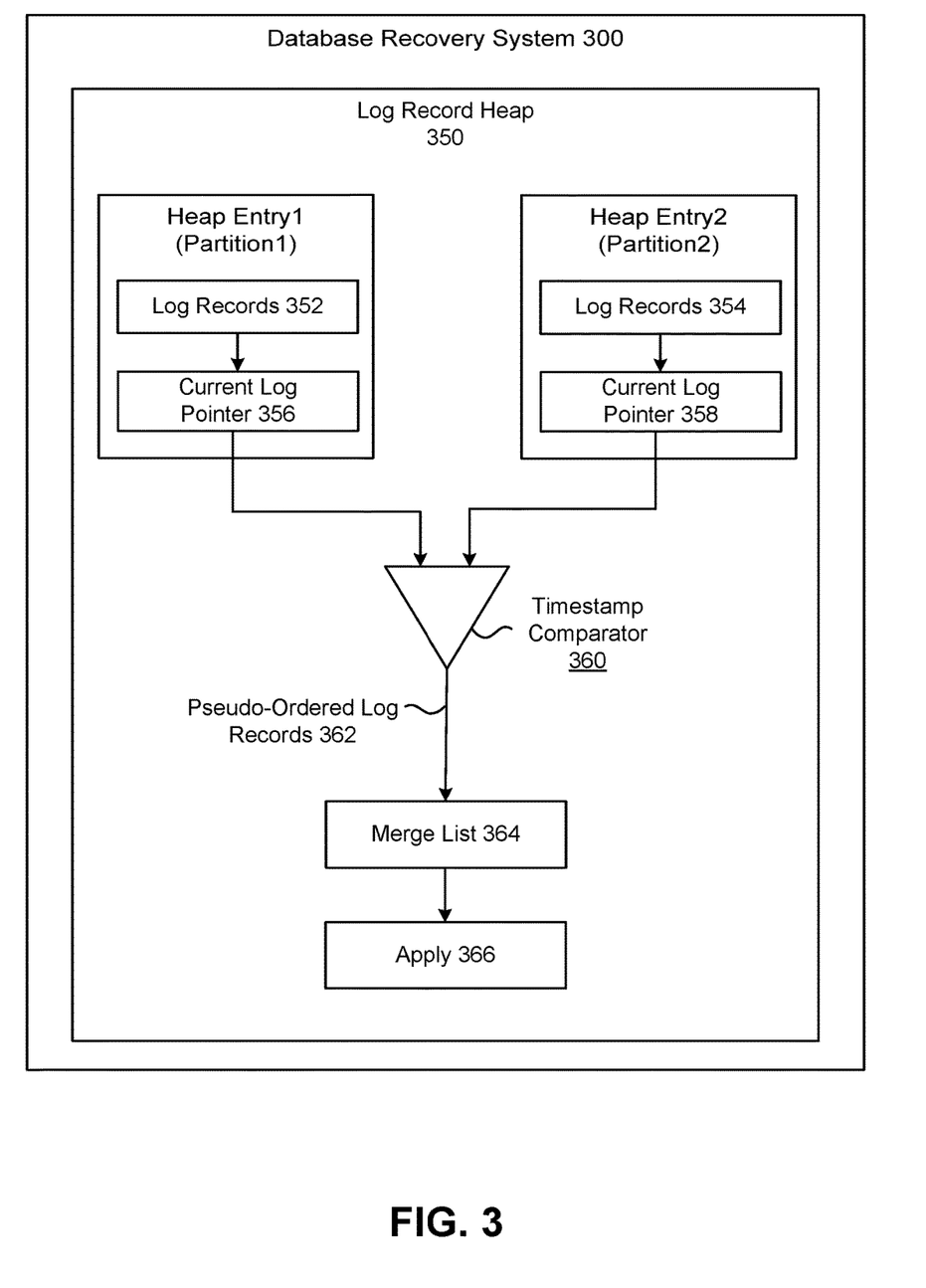
FIG. 3 depicts a conceptual diagram of an example embodiment of a database recovery system in accordance with the techniques described in this disclosure.

FIG. 3 depicts a conceptual diagram of an example embodiment of a database recovery system in accordance with the techniques described in this disclosure. In the illustrated embodiment, the database recovery system 300 comprises a log record heap data structure 350. The log record heap data structure 350 includes two entries heap entry1 associated with partition1 and heap entry2 associated with partition2. Heap entry1 comprises log records 352 and a log pointer 356 and heap entry2 comprises log records 354 and a log pointer 358.

During system restore operations, the log records stored in the last log buffer pages of partition1 and partition2 are copied into their respective entries in the log record heap data structure 350. The timestamps of the log record stored at the head of the running log pointers 356 and 358 can then be compared by timestamp comparator 360, and the log record with the lowest timestamp (e.g., earliest timestamp) in the sequence are output in a pseudo-ordered list 364. This pseudo-ordered log records 362 can be organized into the merge list 364 based on timestamp and subsequently applied to the database log file by module or component 366.

During recovery the transactions may be applied as they occurred on each physical page. As shown, in the merged list 220, the log records 222 is a pseudo-ordered sequence of the log records 204, 212, 214, 206, 208, and 216 based on timestamp with the earliest/lowest timestamp first. Whichever log record has the earliest sequential timestamp may then be applied to the database log first.

The techniques described in this disclosure may be extensible to any number of partitions on the host server 105. Alternatively, these techniques may be extensible to any number of physical machines in a database cluster.

Figure 4:
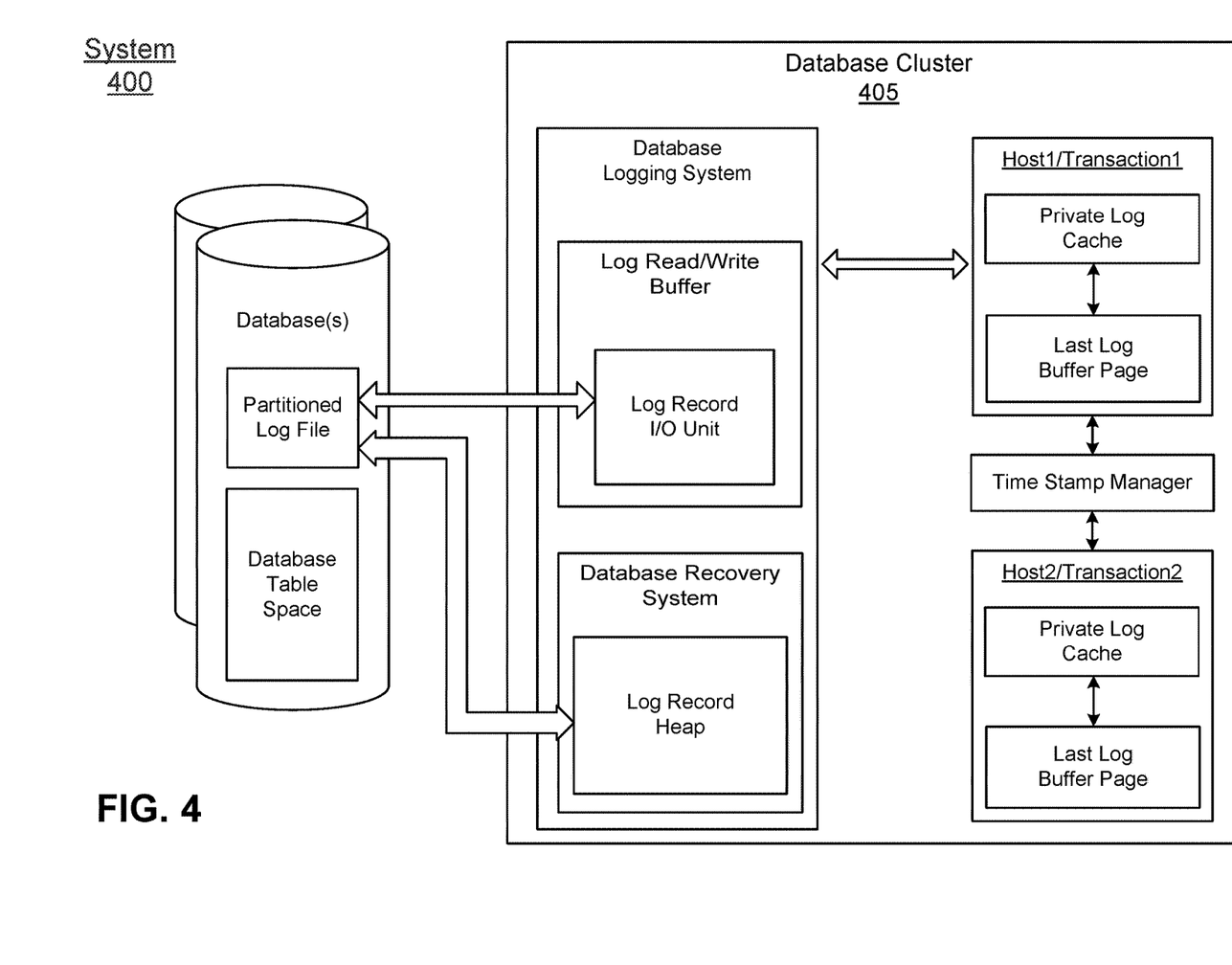
FIG. 4 depicts a conceptual block diagram of an alternative example embodiment of a database logging system in accordance with the techniques described in this disclosure.

The operations of the present disclosure may be alternatively performed by separate hosts within a cluster of servers. FIG. 4 depicts a conceptual block diagram of an alternative example embodiment of a database logging system in accordance with the techniques described in this disclosure. This embodiment is similar to the embodiment described in FIG. 1, but for a database cluster 405 comprising multiple hosts. In this case, the transactions may be allocated to a different host server (host1 or host2) within the database cluster. The system is able to call multiple disk I/O operations for extreme OLTP, and the partitions may be separate processes running on a single machine or on multiple physical machines in parallel. The embodiment comprising multiple hard disks may provide more throughput, but this is not a requirement. Database log files may be stored on hard disk for durability.

II. Illustrative Processes

The following figures depict example flow charts illustrating various embodiments of a process in a partitioned log in accordance with the techniques described in this disclosure. It is noted that the processes described below are exemplary in nature and are provided for illustrative purposes and are not intended to limit the scope of this disclosure to any particular example embodiment. For instance, processes in accordance with some embodiments may include or omit some or all of the operations described below, or may include operations in a different order than described. The particular processes described in this disclosure are not intended to be limited to any particular set of operations exclusive of other intermediate operations.

In addition, the operations described in this disclosure may be embodied in computer-executable program code, which causes a general-purpose or special-purpose computer to perform certain functional operations. In other instances, these operations may be performed by specific hardware components or hardwired circuitry, or by any combination of programmed computer components and custom hardware circuitry.

Figure 5A:
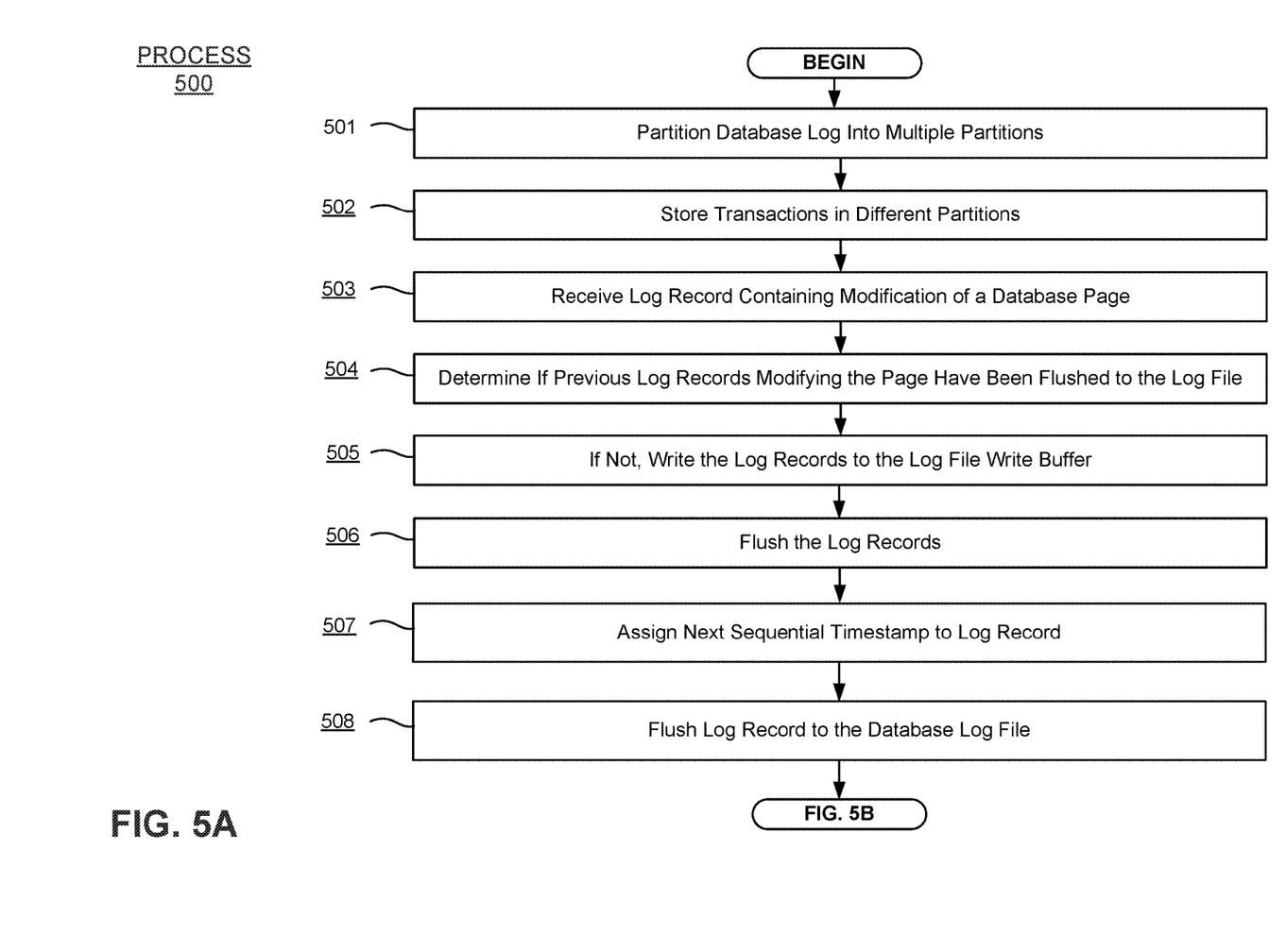
FIG. 5A depicts a flow chart of an example embodiment of a process for performing data operations in a partitioned database log in accordance with the techniques described herein.

FIG. 5A depicts a flow chart of an example embodiment of a process for performing data operations in a partitioned database log in accordance with the techniques described herein. In the illustrated embodiment, process 500 begins at operation 501 where a database log file is partitioned into a plurality of partitions. A database log file may be configured to record transactions for the database. Process 500 can then store log records for a plurality of transactions in different partitions (operation 502). For example, in one embodiment, log records for a first transaction can be stored in a first log record memory associated with a first partition of the database log file, and log records for a second transaction can be stored in a second log record memory associated with a second partition of the database log file. In one embodiment, the first and second log record memories may comprise a private log cache. Such a private log cache may be implemented using memory units, buffers, etc.

Process 500 continues by receiving a log record for a transaction containing a modification to be applied to a page of the database (operation 503) and determining whether previous log records containing modifications to the page have been flushed to the database log file (operation 504). In one embodiment, the previous log records may include a previously assigned sequential timestamp. If the previous log records with assigned timestamps have not been flushed to the database log file, process 500 continues by writing the log records with assigned timestamps to a log file write buffer (operation 505) and flushing the log records in the log file write buffer to be stored in the database (operation 506). At operation 507, the next sequential timestamp in the sequence of timestamps can be assigned to the log record containing the modification to be applied to the page. The log record can then be flushed to the database log file (operation 508). In one embodiment, optionally the partitions can be assigned to the transaction.

Figure 5B:
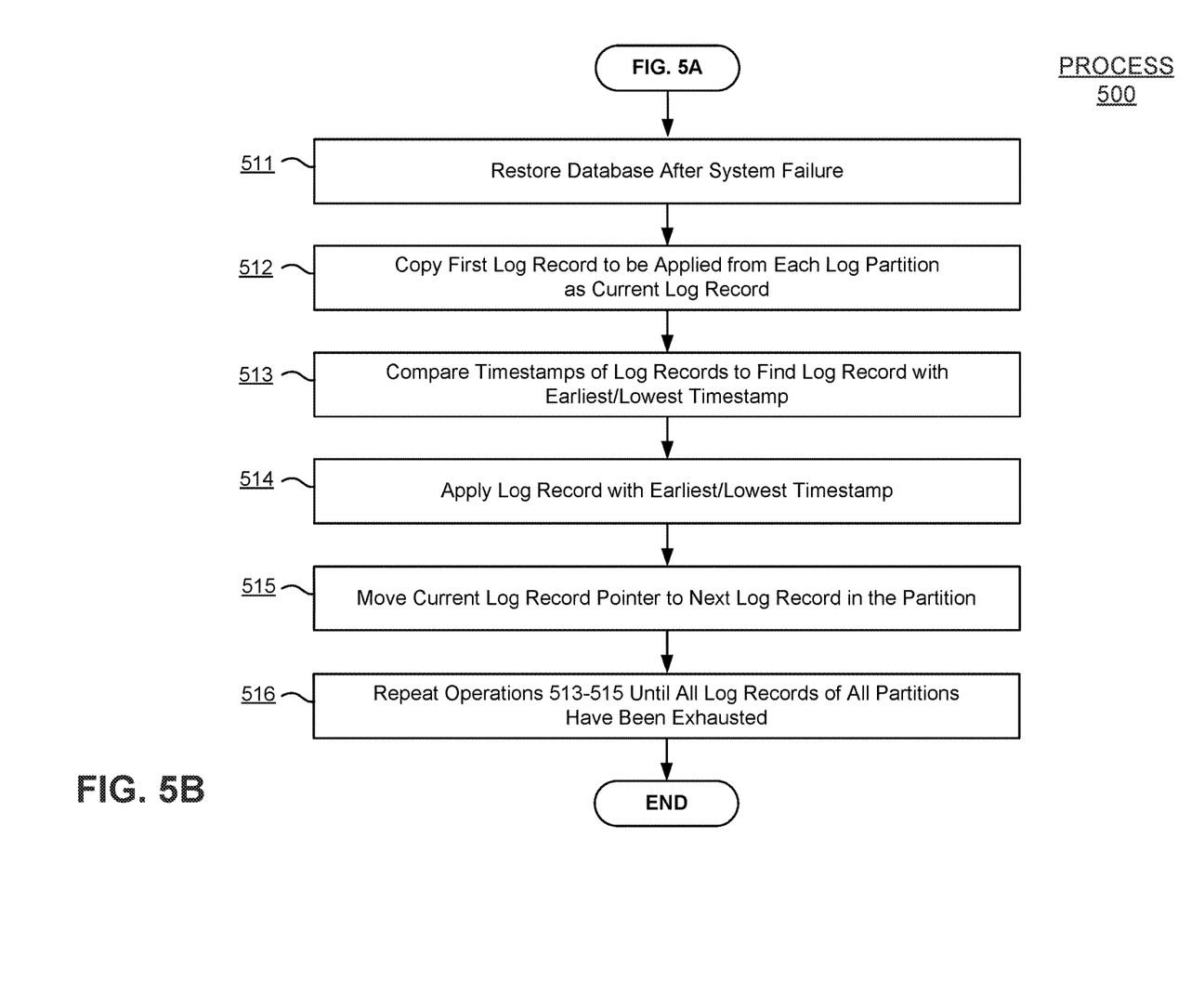
FIG. 5B depicts a restore operation for the embodiment of the process described in FIG. 5A.

Process 500 continues at FIG. 5B, which depicts an example embodiment of a restore operation for the embodiment of the process described in FIG. 5A. At operation 511, process 500 continues by restoring the database, e.g., after a system failure. In one embodiment, the restore operation may include copying a first log record to be applied from each log partition as the current log record (operation 512), comparing timestamps of the log records to find a log record with the earliest/lowest timestamp (operation 513), applying the log record with the earliest/lowest timestamp (operation 514), and moving the log record pointer of the current log record to the next log record in the partition (operation 515). At operation 516, operations 513-515 are repeated until all log records of all partitions have been exhausted.

As discussed previously, in one embodiment a priority queue is implemented as a heap data structure. The sequential timestamps may be unique across the plurality of partitions and may be continuously increasing in sequence. A page to be modified can be pinned to a particular partition that is processing a current modification to the page. This completes process 500 according to one example embodiment.

III. Illustrative Hardware Implementation

Embodiments of the present disclosure may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

Figure 6:
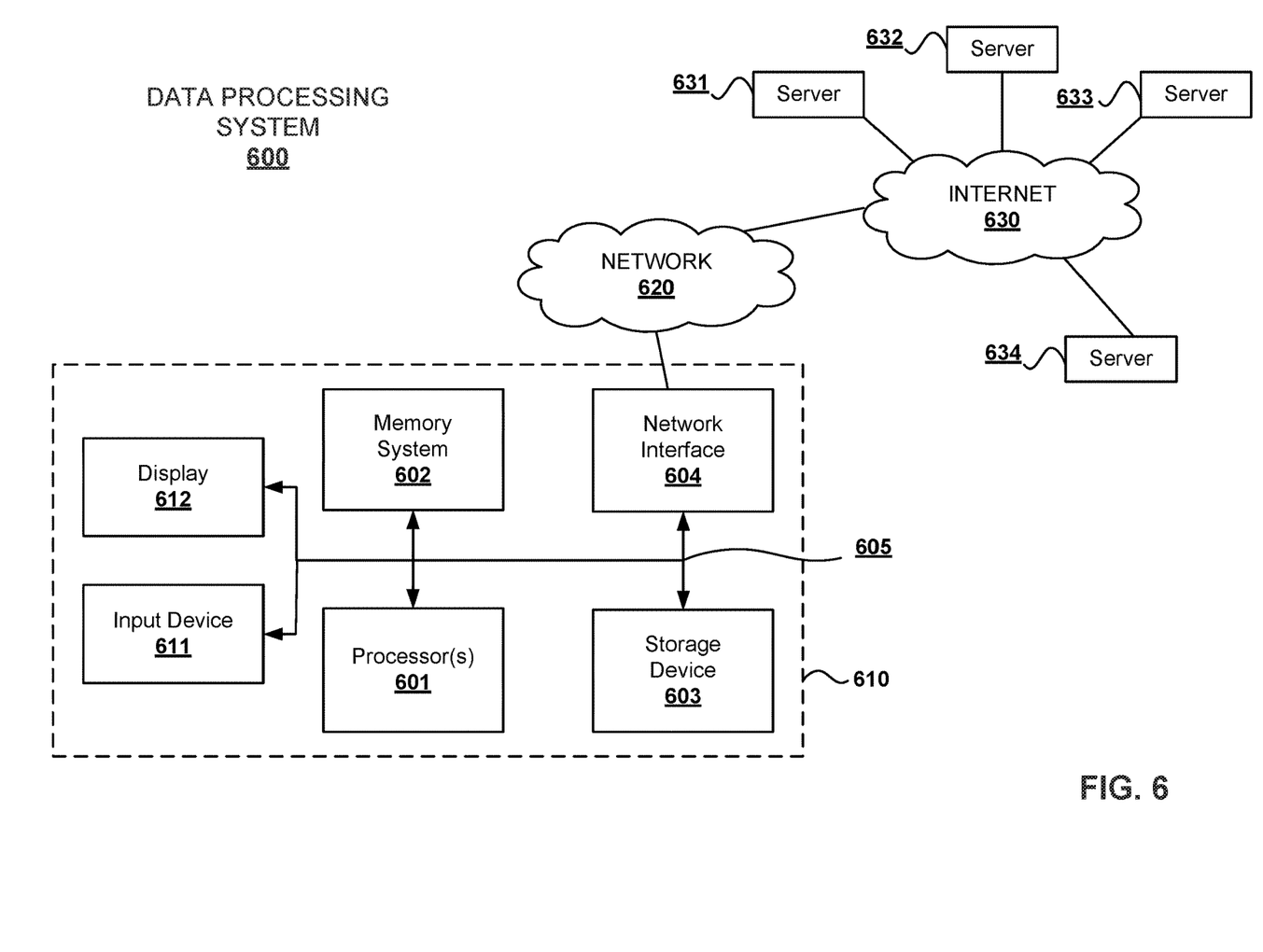
FIG. 6 depicts an example overview block diagram of a data processing system upon which the embodiments described in the present disclosure may be implemented.

FIG. 6 depicts an example overview block diagram of a data processing system upon which the embodiments described in this disclosure may be implemented. It is to be understood that a variety of computers configurations may be used to implement the described techniques. While FIG. 6 illustrates various components of a data processing system 600, it is not intended to represent any particular architecture or manner of interconnecting components. It will also be appreciated that network computers and other data processing systems, which have fewer components or additional components, may be used. The data processing system 600 may, for example, comprise a personal computer (PC), workstation, laptop computer, tablet, smartphone or other hand-held wireless device, or any device having similar functionality.

In the illustrated embodiment, data processing system 600 includes a computer system 610. Computer system 610 includes an interconnect bus 605 (or other communication mechanism for communicating information) and one or more processor(s) 601 coupled with the interconnect bus 605 for processing information. Computer system 610 also includes a memory system 602 coupled with the one or more processors 601 via the interconnect bus 605. Memory system 602 is configured to store information and instructions to be executed by processor 601, including information and instructions for performing the techniques described above. This memory system may also be used for storing programs executed by processor(s) 601. Possible implementations of this memory system may be, but are not limited to, random access memory (RAM), read only memory (ROM), or combination thereof.

In the illustrated embodiment, a storage device 603 is also provided for storing information and instructions. Typically storage device 603 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 603 may store source code, binary code, or software files for performing the techniques above. In addition, while FIG. 6 shows that storage device 603 as a local device connected with the components of the data processing system, it will be appreciated by skilled artisans that the described techniques may use a storage device remote from the system, such as a database or other network storage device coupled with the computer system 610 through a network interface such as network interface 604.

Network interface 604 may provide communications between computer system 610 and a network 620. The network interface 604 may be a wireless or wired connection, or any combination thereof. Computer system 610 is configured to send and receive information through the network interface 604 across one or more networks 620 such as a local area network (LAN), wide-area network (WAN), wireless or Bluetooth network, or the Internet 630, etc. Computer system 610 may access data and features on systems residing on one or multiple different hardware servers 631-634 across the network 620. Hardware servers 631-634 and associated server software may also reside in a cloud computing environment.

Storage device and memory system are both examples of non-transitory computer readable storage media. Embodiments in this disclosure can be embodied in computer-readable code stored on any computer-readable medium, which when executed by a computer or other data processing system, can be adapted to cause the system to perform operations according to the techniques described in this disclosure. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 610 may be coupled via interconnect bus 605 to a display 612 for displaying information to a computer user. An input device 611 such as a keyboard, touchscreen, and/or mouse is coupled to bus 605 for communicating information and command selections from the user to processor 601. The combination of these components allows the user to communicate with the system. In some systems, bus 605 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the disclosure. It will be apparent, however, to persons skilled in the art that these embodiments may be practiced without some of these specific details. The above examples and embodiments should not be deemed to be the only embodiments, and are presented to illustrate the flexibility and advantages of the present disclosure. Other arrangements, embodiments, implementations and equivalents will be evident to those skilled in the art and may be employed without departing from the spirit and scope of the disclosure as defined by the following claims.

What is claimed is:

1. A method in a database system in communication with a database, the method comprising:
    partitioning a database log file on the database configured to record transactions for the database into a plurality of partitions;
    storing, by a server in communication with the database, log records for a first transaction in a first private log cache associated with a first partition of the database log file and storing log records for a second transaction in a second private log cache associated with a second partition of the database log file;
    receiving, by the server, a first log record for the first transaction containing a modification to be flushed to a page of the database;
    storing, by the server, the first log record in the first private log cache;
    copying, by the server, the first log record to a first log buffer page associated with the first partition based on the first log record modifying the page of the database;
    determining, by the server, whether previous log records containing modifications to the page and stored on the server in one or more other log buffer pages associated with one or more other partitions have been flushed to the database log file, wherein the previous log records include a previously assigned sequential timestamp; and
    if the previous log records with assigned timestamps have not been flushed to the database log file on the database:
        writing, by the server, the previous log records with assigned timestamps to a log file write buffer;
        assigning, by the server, a next sequential timestamp in a sequence of timestamps to the first log record containing the modification to be flushed to the page; and
        flushing, by the server, the first log record to the database log file on the database.

2. The method of claim 1 wherein if the previous log records with assigned timestamps have been flushed to the database log file, the method further comprises:
    assigning a next sequential timestamp in a sequence of timestamps to the log record containing the modification to be flushed to the page; and
    applying the log record to the database log file.

3. The method of claim 1 wherein the previous log records with assigned timestamps are flushed to the database before the next sequential timestamp is assigned.

4. The method of claim 1 further comprising restoring the database after a system failure comprising:
    copying a first log record to be applied from each log partition as the current log record;
    comparing timestamps of the log records to find a log record with the earliest sequential timestamp;
    applying the log record with the earliest sequential timestamp;
    moving a log record pointer of the current log record to a next log record in the partition; and
    repeating the comparing, applying and moving until the log records of the partitions have been exhausted.

5. The method of claim 4 wherein comparing timestamps is implemented as a heap data structure with one entry for each partition.

6. The method of claim 1 wherein the sequential timestamps are unique across the plurality of partitions and are continuously increasing in sequence.

7. The method of claim 1 wherein log records from different transactions attempting to modify a same page of the database are received in order.

8. The method of claim 1 wherein each transaction or transaction family is allocated to one partition of the plurality of partitions.

9. The method of claim 1 wherein a page to be modified is pinned to a partition that is processing a current modification to the page.

10. The method of claim 1 wherein the first partition of the database log file is different from the second partition of the database log file.

11. A system comprising:
    a database server in communication with a database via one or more communication mediums, the database server comprising a processor and a system memory configured to store programmed computer code, which when executed by the processor, causes the processor to perform operations comprising:

partitioning a database log file on the database configured to record transactions for the database into a plurality of partitions;

storing, by a server in communication with the database, log records for a first transaction in a first private log cache associated with a first partition of the database log file and storing log records for a second transaction in a second private log cache associated with a second partition of the database log file;

receiving, by the server, a first log record for the first transaction containing a modification to be flushed to a page of the database;

storing, by the server, the first log record in the first private log cache;

copying, by the server, the first log record to a first log buffer page associated with the first partition based on the first log record modifying the page of the database;

determining, by the server, whether previous log records containing modifications to the page and stored on the server in one or more other log buffer pages associated with one or more other partitions have been flushed to the database log file, wherein the previous log records include a previously assigned sequential timestamp; and if the previous log records with assigned timestamps have not been flushed to the database log file on the database:

writing, by the server, the previous log records with assigned timestamps to a log file write buffer;

assigning, by the server, a next sequential timestamp in a sequence of timestamps to the first log record containing the modification to be flushed to the page; and flushing, by the server, the first log record to the database log file on the database.

12. The system of claim 11 wherein if the previous log records with assigned timestamps have been flushed to the database log file, the operations further comprise:

assigning a next sequential timestamp in a sequence of timestamps to the log record containing the modification to be flushed to the page; and applying the log record to the database log file.

13. The system of claim 11 wherein the previous log records with assigned timestamps are flushed to the database before the next sequential timestamp is assigned.

14. The system of claim 11 wherein the operations further comprise restoring the database after a system failure comprising:

copying a first log record to be applied from each log partition as the current log record;

comparing timestamps of the log records to find a log record with the earliest sequential timestamp;

applying the log record with the earliest sequential timestamp;

moving a log record pointer of the current log record to a next log record in the partition; and repeating the comparing, applying and moving until the log records of the partitions have been exhausted.

15. The system of claim 14 wherein comparing timestamps is implemented as a heap data structure with one entry for each partition.

16. The system of claim 11 wherein the sequential timestamps are unique across the plurality of partitions and are continuously increasing in sequence.

17. A non-transitory computer readable medium storing programmed computer code, which when executed by a processor, causes the processor to perform operations in a database system comprising a database server in communication with a database, the operations comprising:

partitioning a database log file on the database configured to record transactions for the database into a plurality of partitions;

storing, by a server in communication with the database, log records for a first transaction in a first private log cache associated with a first partition of the database log file and storing log records for a second transaction in a second private log cache associated with a second partition of the database log file;

receiving, by the server, a first log record for the first transaction containing a modification to be flushed to a page of the database;

storing, by the server, the first log record in the first private log cache;

copying, by the server, the first log record to a first log buffer page associated with the first partition based on the first log record modifying the page of the database;

determining, by the server, whether previous log records containing modifications to the page and stored on the server in one or more other log buffer pages associated with one or more other partitions have been flushed to the database log file, wherein the previous log records include a previously assigned sequential timestamp; and if the previous log records with assigned timestamps have not been flushed to the database log file on the database:

writing, by the server, the previous log records with assigned timestamps to a log file write buffer;

assigning, by the server, a next sequential timestamp in a sequence of timestamps to the first log record containing the modification to be flushed to the page; and flushing, by the server, the first log record to the database log file on the database.

18. The computer readable medium of claim 17 wherein if the previous log records with assigned timestamps have been flushed to the database log file, the operations further comprise:

assigning a next sequential timestamp in a sequence of timestamps to the log record containing the modification to be flushed to the page; and applying the log record to the database log file.

19. The computer readable medium of claim 17 wherein the operations further comprise restoring the database after a system failure comprising:

copying a first log record to be applied from each log partition as the current log record;

comparing timestamps of the log records to find a log record with the earliest sequential timestamp;

applying the log record with the earliest sequential timestamp;

moving a log record pointer of the current log record to a next log record in the partition; and repeating the comparing, applying and moving until the log records of the partitions have been exhausted.

20. The computer readable medium of claim 17 wherein the sequential timestamps are unique across the plurality of partitions and are continuously increasing in sequence.

* * * * *